United States Patent

Hsu et al.

[11] Patent Number: 5,841,636
[45] Date of Patent: Nov. 24, 1998

[54] EXPANSION STRUCTURE FOR INSTALLATION OF COMPACT COMPUTER EXPANSION CIRCUIT BOARDS

[76] Inventors: Jen Chieh Hsu, 4th Fl., No. 58, Hou-Kang St., Shi-Ling Disct., Taipei, Taiwan; Chuan-Pin Hsiung, 3rd Floor, No. 10-2, Lane 109, Mu-Cha Rd., Sec. 2, Taipei, Taiwan

[21] Appl. No.: 783,876

[22] Filed: Jan. 16, 1997

[51] Int. Cl.[6] .................................................. H05K 5/00
[52] U.S. Cl. .................... 361/752; 361/759; 361/784; 361/801; 439/74
[58] Field of Search ..................................... 361/683, 686, 361/784, 789, 790, 791, 796, 752, 759, 801; 439/66, 74

[56] References Cited

U.S. PATENT DOCUMENTS

| 5,121,295 | 6/1992 | Lam | 361/684 |
| 5,642,259 | 6/1997 | Ma | 361/686 |
| 5,667,388 | 9/1997 | Cottrell | 439/74 |

*Primary Examiner*—Leo P. Picard
*Assistant Examiner*—Jayprakash N. Gandhi
*Attorney, Agent, or Firm*—Curtis L. Harrington

[57] ABSTRACT

An expansion structure for compact computers to install expansion circuit boards therein is provided. This expansion structure is small in dimension to save space in a compact computer and also allows easy installation of the expansion circuit boards. The expansion structure includes a base board on which an expansion circuit board is mounted, an enclosure having at least one engaging slot for accommodating the base board therein, and a main board which is mounted in the enclosure and formed with an electrical connector. The electrical connector is mounted in a connector receptacle provided on one edge of the engaging slot for the main board to have an electrical connection with the expansion circuit board. In installation the base board is inserted into the engaging slot allowing electrical connection pins on the expansion circuit board to come into contact with the electrical connector. After that securing means is used to secure the expansion circuit board in position in the engaging slot. Since the expansion circuit board is installed above and in parallel with the main board, the overall space taken by the expansion circuit board and the expansion structure is reduced. The expansion structure thus allows for increased expansion capacity for the compact computers.

8 Claims, 4 Drawing Sheets

EXPANSION STRUCTURE FOR INSTALLATION OF COMPACT COMPUTER EXPANSION CIRCUIT BOARDS

BACKGROUND OF THE INVENTION

1. Field of the Invention

This invention relates to expansion structures for computers to install expansion circuit boards therein, and more particularly, to an expansion structure for compact computers, such as notebook computers, palm top computers, or electronic dictionary machines, to install expansion circuit boards therein.

2. Description of Related Art

A conventional way for desk top computers to install expansion circuit boards is to provide a plurality of expansion connection slots on the mother boards of the computers for the connection pins of expansion circuit boards to plug therein. However, most expansion slots along with the expansion circuit boards installed thereon occupy quite a large space in the computer casing. For this reason, the conventional expansion structure is not suitable for use on compact computers, such as notebook computers, palm top computers, palm top electronic dictionary machines, and the like. To provide small expansion structures on these compact computers, high precision machine tools should be employed, which significantly increases the manufacturing cost. The compact computers are thus high in price and limited in expansion capacity. To provide additional functionality to these compact computers, the user needs to purchase and install external devices that provide the desired functionality. The hardware cost is quite high for the users. This drawback also limits the development of the compact computers.

SUMMARY OF THE INVENTION

It is therefore a primary objective of the present invention to provide an expansion structure which allows easy installation of expansion circuit boards thereon.

It is another objective of the present invention to provide an expansion structure which is small in dimension to save space in a compact computer.

In accordance with the foregoing and other objectives of the present invention, an improved expansion structure for compact computers is provided. The expansion structure includes a base board to which an expansion circuit board is removably attached, an enclosure with which the base board is engaged, and a main board received within the enclosure. On the expansion circuit board, there is formed with an array of electrical connection pins. The enclosure is provided with at least one engaging slot for accommodating the base board therein. The engaging slot can be additionally provided in multiple according to actual requirements. The engaging slot has one edge provided with a connector receptacle. which is formed with an opening. The base board is adapted to be accommodated in the enclosure. An electrical connector is mounted on the main board. The electrical connector is constructed with an electrical conductive tape having a contact portion received within the opening of the connector receptacle for electrical connection to the electrical connection pins on the expansion circuit board. The base board is inserted into the engaging slot, allowing the electrical connection pins on the expansion circuit board to come into electrical contact with the electrical connector on the main board.

Thereafter, securing means is used to secure the expansion circuit board in position to the enclosure in order for the expansion circuit board to come into a secure electrical contact with the main board. In various embodiments, the securing means can be either a plurality of screws which screw through a plurality of screw holes in the expansion circuit board, or includes a slidable protective cover which is slidably provided on the enclosure, or includes at least one locking piece provided on the enclosure so as to secure the expansion circuit board to the enclosure.

In installation, the base board is inserted into the engaging slot, allowing the electrical connection pins on the expansion circuit board to come into contact with the contact portion of the electrical connector in the opening of the connector receptacle. After that, the securing means is used to secure the expansion circuit board in position in the engaging slot. This completes the installation of the expansion circuit board in the expansion structure of the invention. Since the expansion circuit board is installed above and in parallel with the main board, the overall space taken by the expansion circuit board and the expansion structure is reduced. The invention thus allows for increased expansion capacity for the computer.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENT

Figure 1:
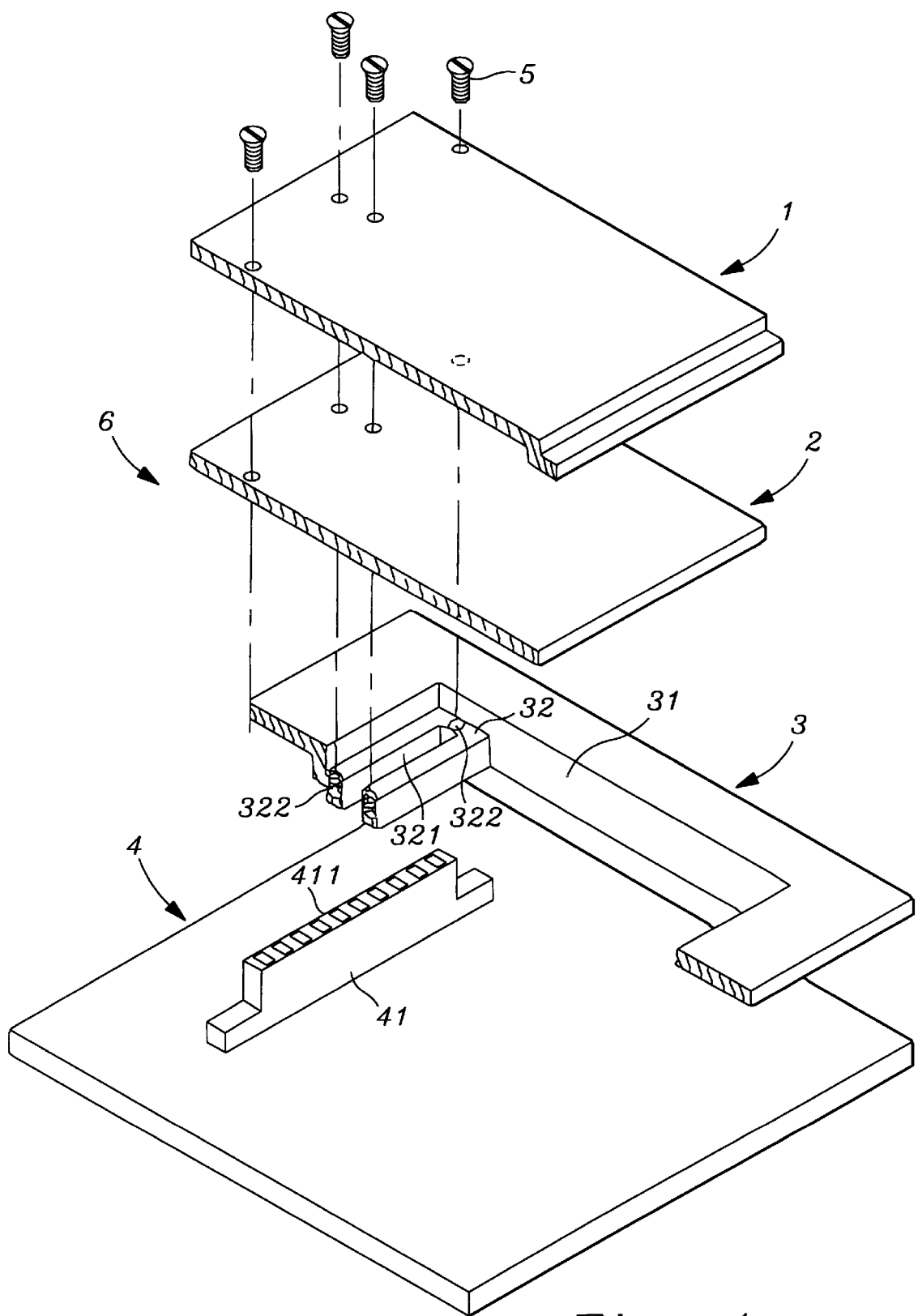
FIG. 1 is an exploded perspective view of a first preferred embodiment of the expansion structure according to the present invention.
Figure 2:
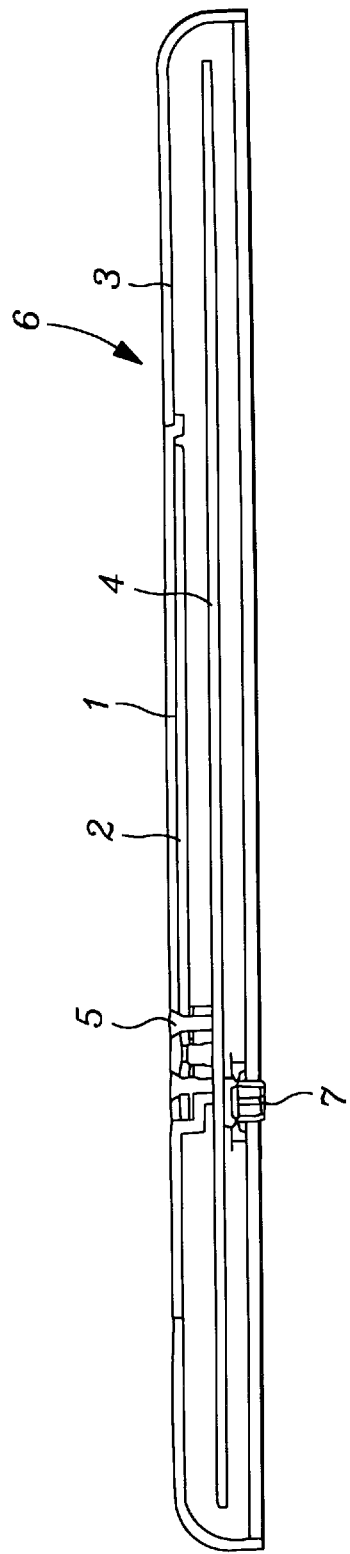
FIG. 2 is a schematic sectional diagram of the expansion structure of FIG. 1 cutting through the line A—A.

Referring to FIGS. 1 and 2, the reference numeral 1 designates a base board, 2 designates an expansion circuit board, 3 designates an enclosure, 4 designates a main board, 5 designates screws, and 6 designates the expansion structure of the invention.

Figure 3:
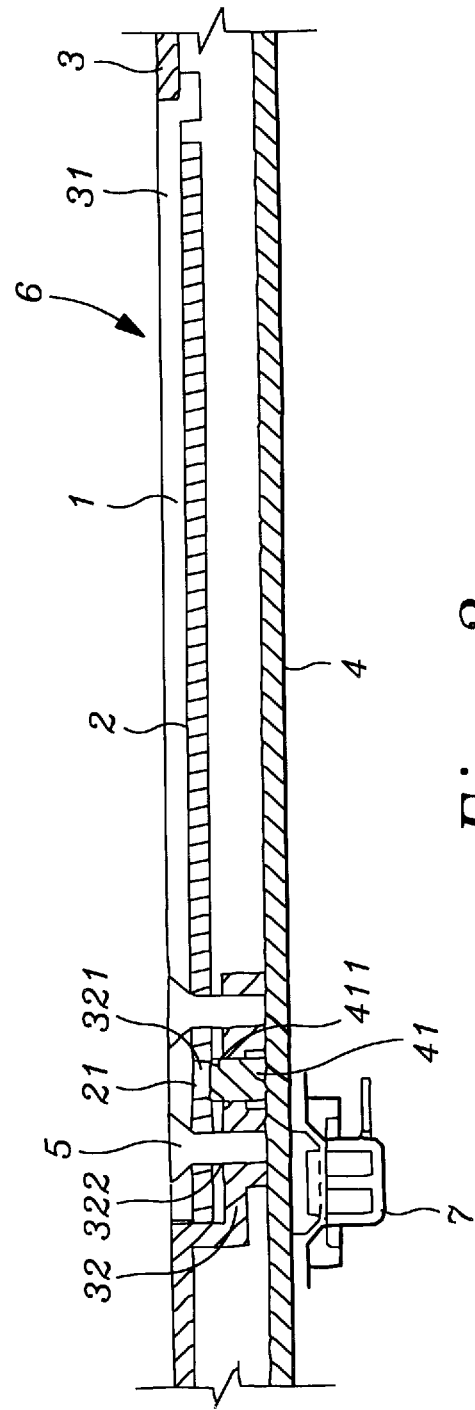
FIG. 3 is an enlarged view of part of the expansion structure shown in FIG. 2.

Referring to FIGS. 1 and 3, the expansion circuit board 2 is mounted on the base board 1. An array of electrical connection pins 21 is adapted to form on the expansion circuit board 2. The enclosure 3 is formed with an engaging slot 31 which is used to accommodate the base board 1 therein. The engaging slot 31 is formed with a connector receptacle 32 on the edge thereof Further, the connector receptacle 32 is formed with an opening 321. The main board 4 is mounted within the enclosure 3. An electrical connector 41 is mounted on the main board 4. The electrical connector 41 is constructed with an electrical conductive tape having a contact portion 411 received in the opening 321 for electrical connection to the electrical connection pins 21 on the expansion circuit board 2. The screws 5 are used to secure the base board 1 through screw holes 322 formed in the connector receptacle 32. In FIG. 3, the reference numeral 7 designates a panel button mounted on the enclosure 3.

Figure 4:
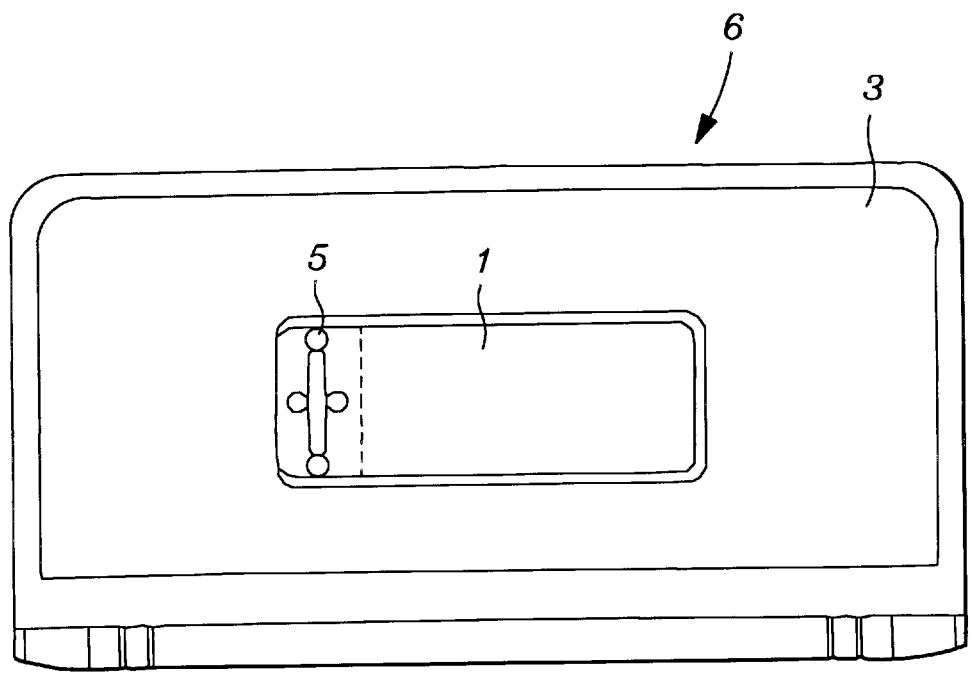
FIG. 4 is a top view of the expansion structure of FIG. 1.

Referring to FIGS. 3 and 4, to install the expansion circuit board 2 in the expansion structure 6, the base board 1 to which the expansion circuit board 2 is attached is first inserted into the engaging slot 31, allowing the electrical connection pins 21 on the expansion circuit board 2 to come into contact with the contact portion 411 of the electrical connector 41 in the opening 321 of the connector receptacle 32. After that, the screws 5 are used to secure the expansion circuit board 2 in position in the engaging slot 31. This completes the installation of the expansion circuit board 2 in the expansion structure 6.

Figure 5:
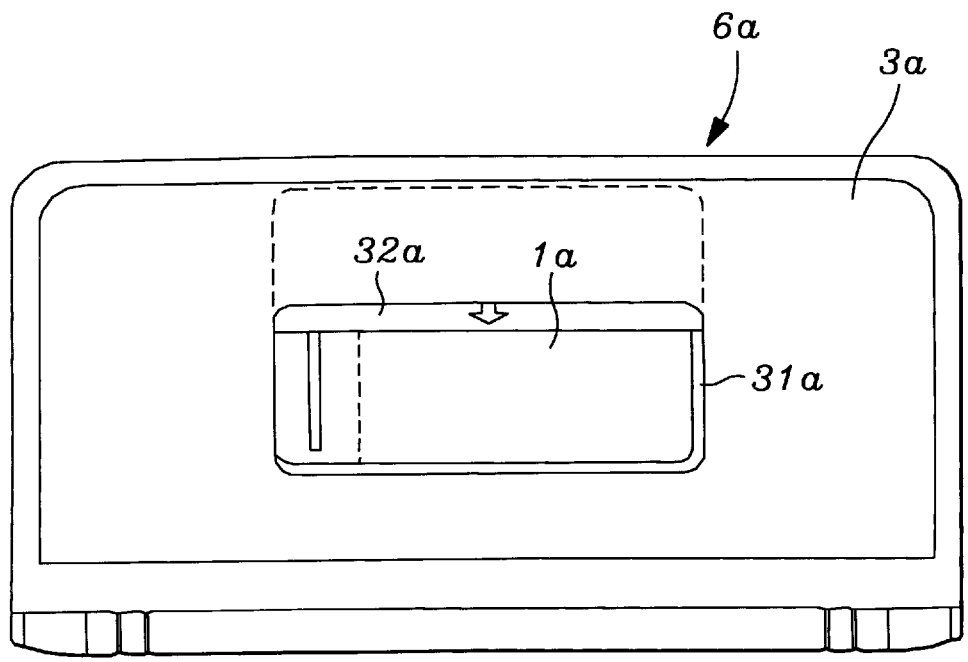
FIG. 5 is a top view of a second preferred embodiment of the expansion structure according to the present invention.

FIG. 5 is a top view of a second preferred embodiment of the expansion structure according to the present invention. This expansion structure 6a includes an enclosure 3a which is provided with a slidable protective cover 32a. In installation, the protective cover 32a is opened so as to allow the base board 1a to be inserted into the engaging slot 31a. After that, the protective cover 32a is closed again. This also allows the base board 1a to be secured in the engaging slot 31a. This completes the installation of the expansion circuit board 2 on the expansion structure 6a.

Figure 6:
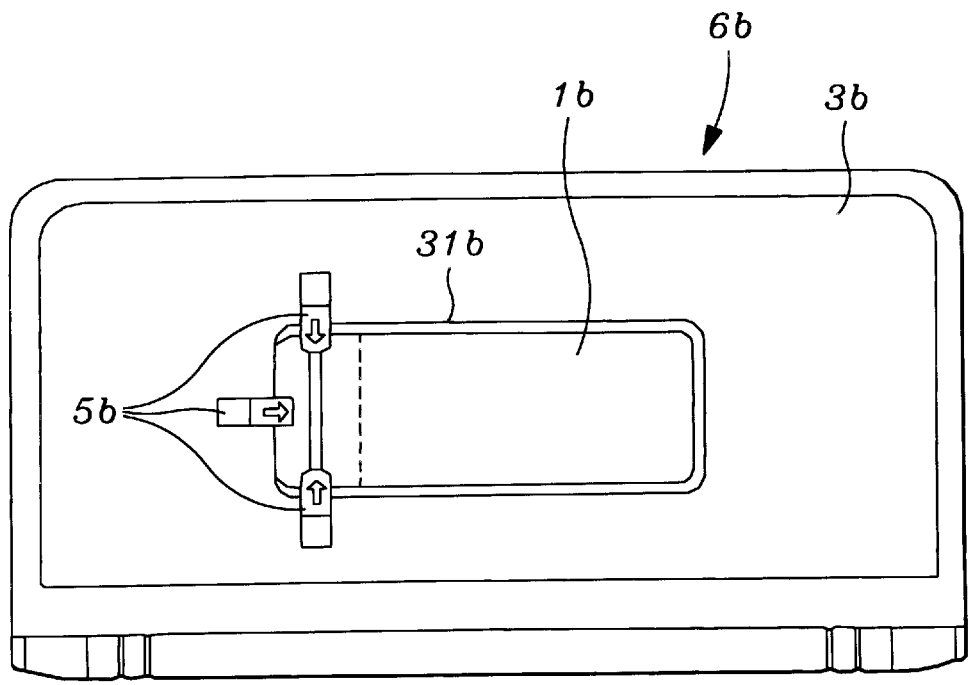
FIG. 6 is a top view of a third preferred embodiment of the expansion structure according to the present invention.

FIG. 6 is a top view of a third preferred embodiment of the expansion structure according to the present invention. This expansion structure 6b includes an enclosure 3b which is provided with a plurality of slidable locking pieces 5b. In installation, the base board 1b is inserted into the engaging slot 31b, and after that, the locking pieces 5b are pushed inwards so as to lock the base board 1b in position in the engaging slot 31b. This completes the installation of the expansion circuit board 2 on the expansion structure 6b.

Through field testing, it is found that the expansion structure of the invention allows the main board to install expansion circuit boards more easily than the prior art to provide additional functionality or settings to the compact computers. Further, the expansion structure of the invention is small in size, which allows it to be used in compact computers, such as notebook computers, palm top computers, or the like. The advantage of the invention over the prior art is therefore apparent.

The invention has been described using exemplary preferred embodiments. However, it is to be understood that the scope of the invention is not limited to the disclosed embodiments. To the contrary, it is intended to cover various modifications and similar arrangements. The scope of the clams, therefore, should be accorded the broadest interpretation so as to encompass all such modifications and similar arrangements.

What is claimed is:

1. An expansion structure, comprising:

a base board on which an expansion circuit board having an array of electrical connection pins is replaceably mounted;

an enclosure having at least one engaging slot for accommodating said base board therein;

a main board which is mounted in said enclosure and formed with an electrical connection; and securing means provided on said enclosure;

wherein said base board is inserted into said engaging slot, allowing the electrical connection pins on said expansion circuit board to come into electrical contact with the electrical connector on said main board; and wherein said securing means secures said expansion circuit board in position in said enclosure.

2. The expansion structure of claim 1, wherein said electrical connector is constructed with an electrical conductive tape.

3. The expansion structure of claim 2, wherein said electrical connector is further formed with a contact portion.

4. The expansion structure of claim 1, wherein said securing means includes a plurality of screws which screw through a plurality of screw holes in said expansion circuit board so as to secure said expansion circuit board on said enclosure.

5. The expansion structure of claim 1, wherein said securing means is a slidable protective cover which is slidably provided on said enclosure.

6. The expansion structure of claim 1, wherein said securing means includes at least one locking piece provided on said enclosure.

7. The expansion structure of claim 1, wherein said engaging slot has one edge provided with a connector receptacle for accommodating said electrical connector.

8. The expansion structure of claim 7, wherein said connector receptacle is formed with an opening for receiving said contact portion of said electrical connector.

* * * * *